(12) United States Patent
Galbo

(10) Patent No.: US 10,795,576 B2
(45) Date of Patent: Oct. 6, 2020

(54) DATA RELOCATION IN MEMORY

(71) Applicant: Micron Technology, Inc., Boise, ID (US)

(72) Inventor: Neal A. Galbo, Boca Raton, FL (US)

(73) Assignee: Micron Technology, Inc., Boise, ID (US)

( * ) Notice: Subject to any disclaimer, the term of this patent is extended or adjusted under 35 U.S.C. 154(b) by 152 days.

(21) Appl. No.: 16/177,985

(22) Filed: Nov. 1, 2018

(65) Prior Publication Data
US 2020/0142589 A1 May 7, 2020

(51) Int. Cl.
*G06F 3/06* (2006.01)
(52) U.S. Cl.
CPC .......... *G06F 3/0604* (2013.01); *G06F 3/0646* (2013.01); *G06F 3/0673* (2013.01)
(58) Field of Classification Search
CPC .... G06F 3/0604; G06F 3/0673; G06F 3/0646; G06F 3/0679; G06F 3/0647; G06F 3/0652; G06F 2212/7211; G06F 12/1253
See application file for complete search history.

(56) References Cited

U.S. PATENT DOCUMENTS

| | | | |
|---|---|---|---|
| 9,563,549 B2 | 2/2017 | Ahn et al. | |
| 10,228,878 B1 * | 3/2019 | Mateescu | G06F 12/10 |
| 2003/0123287 A1 * | 7/2003 | Gorobets | G06F 3/0659 |
| | | | 365/185.11 |
| 2009/0287875 A1 | 11/2009 | Lin | |
| 2010/0281202 A1 * | 11/2010 | Abali | G11C 29/82 |
| | | | 711/103 |
| 2011/0271030 A1 | 11/2011 | Iaculo et al. | |
| 2013/0311703 A1 | 11/2013 | Cheng et al. | |

(Continued)

FOREIGN PATENT DOCUMENTS

KR  10-2012-0052028 A  5/2012

OTHER PUBLICATIONS

Qureshi, et al., "Enhancing lifetime and security of PCM-based Main Memory with Start-Gap Wear Leveling," 2009 42nd Annual IEEE/ACM International Symposium on Microarchitecture (Micro), New York, NY, 2009, pp. 14-23. (Year: 2009).*

(Continued)

*Primary Examiner* — Ramon A. Mercado
(74) *Attorney, Agent, or Firm* — Brooks, Cameron & Huebsch, PLLC

(57) ABSTRACT

The present disclosure includes apparatuses, methods, and systems for data relocation in memory. An embodiment includes a controller, and a memory having a plurality of physical units of memory cells. Each of the physical units has a different sequential physical address associated therewith, a first number of the physical units have data stored therein, a second number of the physical units do not have data stored therein, and the physical address associated with each respective one of the second number of physical units is a different consecutive physical address in the sequence. The controller can relocate the data stored in the physical unit of the first number of physical units, whose physical address in the sequence is immediately before the first of the consecutive physical addresses associated with the second number of physical units, to the last of the consecutive physical addresses associated with the second number of physical units.

25 Claims, 5 Drawing Sheets

(56) References Cited

U.S. PATENT DOCUMENTS

2014/0095775 A1    4/2014  Talagala et al.
2017/0123726 A1*   5/2017  Sinclair ................ G06F 3/0679
2020/0142589 A1*   5/2020  Galbo .................. G06F 3/0673

OTHER PUBLICATIONS

Wang G., Peng F., Ju L., Zhang L., Jia Z. (2014) Double Circulation Wear Leveling for PCM-Based Embedded Systems. In: Wu J., Chen H., Wang X. (eds) Advanced Computer Architecture. Communications in Computer and Information Science, vol. 451. Springer, Berlin, Heidelberg (Year: 2014).*

Qureshi, et al. "Enhancing Lifetime and Security of PCM-Based Main Memory with Start-Gap Wear Leveling", IEEE/ACM International Symposium on Microarchitecture (Micro), New York, NY, Dec. 2009, 10 pp.

International Search Report and Written Opinion from related International Application No. PCT/US2019/055289, dated Jan. 28, 2020, 11 pages.

\* cited by examiner

Fig. 4

DATA RELOCATION IN MEMORY

TECHNICAL FIELD

The present disclosure relates generally to semiconductor memory and methods, and more particularly, to data relocation in memory.

BACKGROUND

Memory devices are typically provided as internal, semiconductor, integrated circuits and/or external removable devices in computers or other electronic devices. There are many different types of memory including volatile and non-volatile memory. Volatile memory can require power to maintain its data and can include random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), and resistance variable memory such as phase change random access memory (PCRAM), resistive random access memory (RRAM), and magnetic random access memory (MRAM), among others.

Memory devices can be combined together to form a solid state drive (SSD), an embedded MultiMediaCard (e.MMC), and/or a universal flash storage (UFS) device. An SSD, e.MMC, and/or UFS device can include non-volatile memory (e.g., NAND flash memory and/or NOR flash memory), and/or can include volatile memory (e.g., DRAM and/or SDRAM), among various other types of non-volatile and volatile memory. Non-volatile memory may be used in a wide range of electronic applications such as personal computers, portable memory sticks, digital cameras, cellular telephones, portable music players such as MP3 players, movie players, among others.

Flash memory devices can include memory cells storing data in a charge storage structure such as a floating gate, for instance. Flash memory devices typically use a one-transistor memory cell that allows for high memory densities, high reliability, and low power consumption. Resistance variable memory devices can include resistive memory cells that can store data based on the resistance state of a storage element (e.g., a resistive memory element having a variable resistance).

Memory cells can be arranged into arrays, and memory cells in an array architecture can be programmed to a target (e.g., desired) state. For instance, electric charge can be placed on or removed from the charge storage structure (e.g., floating gate) of a flash memory cell to program the cell to a particular data state. The stored charge on the charge storage structure of the cell can indicate a threshold voltage (Vt) of the cell. A state of a flash memory cell can be determined by sensing the stored charge on the charge storage structure (e.g., the Vt) of the cell.

As an additional example, resistive memory cells can be programmed to store data corresponding to a target data state by varying the resistance level of the resistive memory element. Resistive memory cells can be programmed to a target data state (e.g., corresponding to a particular resistance state) by applying sources of an electrical field or energy, such as positive or negative electrical pulses (e.g., positive or negative voltage or current pulses) to the cells (e.g., to the resistive memory element of the cells) for a particular duration. A state of a resistive memory cell can be determined by sensing current through the cell responsive to an applied interrogation voltage. The sensed current, which varies based on the resistance level of the cell, can indicate the state of the cell.

A single level memory cell (SLC) can be programmed to a targeted one of two different data states, which can be represented by the binary units 1 or 0. Some flash and resistive memory cells can be programmed to a targeted one of more than two data states (e.g., 1111, 0111, 0011, 1011, 1001, 0001, 0101, 1101, 1100, 0100, 0000, 1000, 1010, 0010, 0110, and 1110). Such cells may be referred to as multi state memory cells, multiunit cells, or multilevel cells (MLCs). MLCs can provide higher density memories without increasing the number of memory cells since each cell can represent more than one digit (e.g., more than one bit).

BRIEF DESCRIPTION OF THE DRAWINGS

FIG. 4 illustrates a conceptual example of a sequence of data relocation operations performed in memory in accordance with an embodiment of the present disclosure.

DETAILED DESCRIPTION

Figure 1:
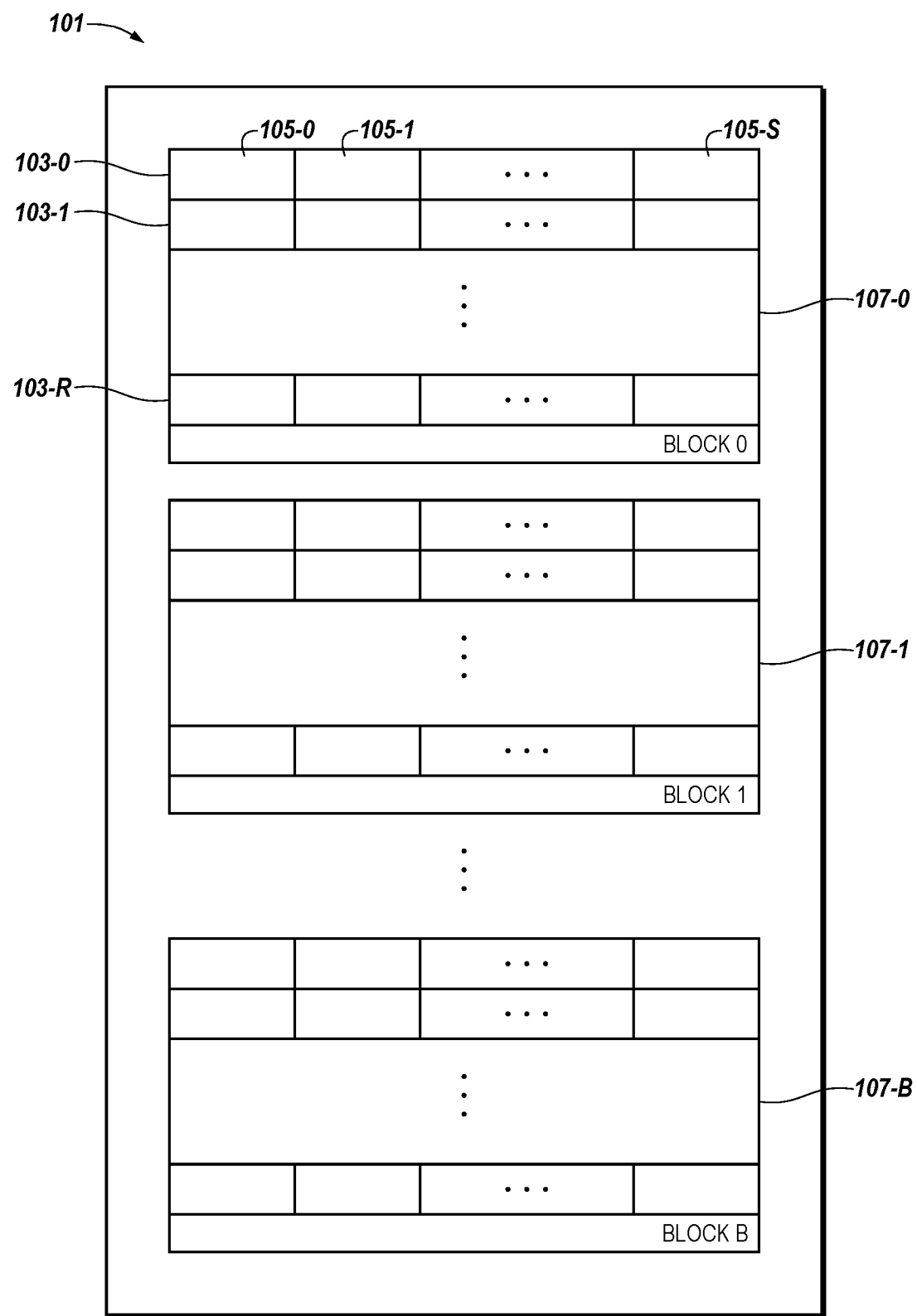
FIG. 1 illustrates a diagram of a portion of a memory array having a number of physical blocks in accordance with an embodiment of the present disclosure.

The present disclosure includes apparatuses, methods, and systems for data relocation in memory. An embodiment includes a controller, and a memory having a plurality of physical units of memory cells. Each of the physical units has a different sequential physical address associated therewith, a first number of the physical units have data stored therein, a second number of the physical units do not have data stored therein, and the physical address associated with each respective one of the second number of physical units is a different consecutive physical address in the sequence. The controller can relocate the data stored in the physical unit of the first number of physical units, whose physical address in the sequence is immediately before the first of the consecutive physical addresses associated with the second number of physical units, to the last of the consecutive physical addresses associated with the second number of physical units.

A wear-leveling operation (e.g. scheme) can include and/or refer to an operation to relocate data currently being stored in one physical location of a memory to another physical location of the memory, in order to more uniformly distribute memory cell wear that may be caused by program (e.g., write) operations across the memory. Performing wear-leveling operations can increase the performance (e.g., increase the speed, increase the reliability, and/or decrease the power consumption) of the memory, and/or can increase the endurance (e.g., lifetime) of the memory.

Previous wear-leveling operations may use tables to relocate the data in the memory. However, such tables may be large (e.g., may use a large amount of space in the memory), may be complex (e.g., may use a large amount of resources) and may cause the wear-leveling operations to be slow (e.g., may cause latency in the memory).

In contrast, operations (e.g., wear-leveling operations) to relocate data in accordance with the present disclosure may maintain an algebraic mapping (e.g., an algebraic mapping between logical and physical addresses) for use in identifying the physical location to which the data has been relocated. Accordingly, operations to relocate data in accordance with the present disclosure may use less space in the memory, may use less resources, and may be faster, than previous wear-leveling operations. Further, operations to relocate data in accordance with the present disclosure may provide a greater increase to (e.g., closer to the theoretical maximum of) the performance and/or endurance of the memory than previous wear-leveling operations.

Further, operations to relocate data in accordance with the present disclosure may be flexible and/or changeable (e.g. tunable), in order to match the wear to the current workloads across the memory, increase or decrease the endurance of the memory to match the current needs of the memory, meet the endurance requirements of certain workloads that would otherwise wear out the memory, and/or match the wear leveling to different types of memory. In contrast, previous wear-leveling operations may not have such flexibility. Further, operations to relocate data in accordance with the present disclosure can provide protection from pathological workloads and/or attacks on targeted memory cells having the intention of causing early failure of the memory.

Further, previous wear level operations may not be implementable in hardware. In contrast, operations (e.g., wear-leveling operations) to relocate data in accordance with the present disclosure may be implementable in hardware. For instance, operations to relocate data in accordance with the present disclosure may be implementable in the controller of the memory completely as hardware, or as a combination of hardware and software. Accordingly, operations to relocate data in accordance with the present disclosure may not impact the latency of the memory, and may not add additional overhead to the memory.

As used herein, "a", "an", or "a number of" can refer to one or more of something, and "a plurality of" can refer to one or more such things. For example, a memory device can refer to one or more memory devices, and a plurality of memory devices can refer to two or more memory devices. Additionally, the designators "R", "B", "S", and "N", as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. For example, 101 may reference element "01" in FIG. 1, and a similar element may be referenced as 201 in FIG. 2.

FIG. 1 illustrates a diagram of a portion of a memory array 101 having a number of physical blocks in accordance with an embodiment of the present disclosure. Memory array 101 can be, for example, a NAND flash memory array. As an additional example, memory array 101 can be a storage class memory (SCM) array, such as, for instance, a three-dimensional cross-point (3D XPoint) memory array, a ferroelectric RAM (FRAM) array, or a resistance variable memory array such as a PCRAM, RRAM, or spin torque transfer (STT) array, among others. Further, although not shown in FIG. 1, memory array 101 can be located on a particular semiconductor die along with various peripheral circuitry associated with the operation thereof.

As shown in FIG. 1, memory array 101 has a number of physical blocks 107-0 (BLOCK 0), 107-1 (BLOCK 1), . . . , 107-B (BLOCK B) of memory cells. The memory cells can be single level cells and/or multilevel cells such as, for instance, two level cells, triple level cells (TLCs) or quadruple level cells (QLCs). As an example, the number of physical blocks in memory array 101 may be 128 blocks, 512 blocks, or 1,024 blocks, but embodiments are not limited to a particular power of two or to any particular number of physical blocks in memory array 101.

A number of physical blocks of memory cells (e.g., blocks 107-0, 107-1, . . . , 107-B) can be included in a plane of memory cells, and a number of planes of memory cells can be included on a die. For instance, in the example shown in FIG. 1, each physical block 107-0, 107-1, . . . , 107-B can be part of a single die. That is, the portion of memory array 101 illustrated in FIG. 1 can be a die of memory cells.

As shown in FIG. 1, each physical block 107-0, 107-1, . . . , 107-B includes a number of physical rows (e.g., 103-0, 103-1, . . . , 103-R) of memory cells coupled to access lines (e.g., word lines). The number of rows (e.g., word lines) in each physical block can be 32, but embodiments are not limited to a particular number of rows 103-0, 103-1, . . . , 103-R per physical block. Further, although not shown in FIG. 1, the memory cells can be coupled to sense lines (e.g., data lines and/or digit lines).

As one of ordinary skill in the art will appreciate, each row 103-0, 103-1, . . . , 103-R can include a number of pages of memory cells (e.g., physical pages). A physical page refers to a unit of programming and/or sensing (e.g., a number of memory cells that are programmed and/or sensed together as a functional group). In the embodiment shown in FIG. 1, each row 103-0, 103-1, . . . , 103-R comprises one physical page of memory cells. However, embodiments of the present disclosure are not so limited. For instance, in an embodiment, each row can comprise multiple physical pages of memory cells (e.g., one or more even pages of memory cells coupled to even-numbered bit lines, and one or more odd pages of memory cells coupled to odd numbered bit lines). Additionally, for embodiments including multilevel cells, a physical page of memory cells can store multiple pages (e.g., logical pages) of data (e.g., an upper page of data and a lower page of data, with each cell in a physical page storing one or more bits towards an upper page of data and one or more bits towards a lower page of data).

As shown in FIG. 1, a page of memory cells can comprise a number of physical sectors 105-0, 105-1, . . . , 105-S (e.g., subsets of memory cells). Each physical sector 105-0, 105-1, . . . , 105-S of cells can store a number of logical sectors of data. Additionally, each logical sector of data can correspond to a portion of a particular page of data. As an example, a first logical sector of data stored in a particular physical sector can correspond to a logical sector corresponding to a first page of data, and a second logical sector of data stored in the particular physical sector can correspond to a second page of data. Each physical sector 105-0, 105-1, . . . , 105-S, can store system and/or user data, and/or can include overhead data, such as error correction code (ECC) data, logical block address (LBA) data, and metadata.

Logical block addressing is a scheme that can be used by a host for identifying a logical sector of data. For example, each logical sector can correspond to a unique logical block address (LBA). Additionally, an LBA may also correspond (e.g., dynamically map) to a physical address, such as a physical block address (PBA), that may indicate the physical location of that logical sector of data in the memory. A logical sector of data can be a number of bytes of data (e.g., 256 bytes, 512 bytes, 1,024 bytes, or 4,096 bytes). However, embodiments are not limited to these examples.

It is noted that other configurations for the physical blocks 107-0, 107-1, . . . , 107-B, rows 103-0, 103-1, . . . , 103-R, sectors 105-0, 105-1, . . . , 105-S, and pages are possible. For example, rows 103-0, 103-1, . . . , 103-R of physical blocks 107-0, 107-1, . . . , 107-B can each store data corresponding to a single logical sector which can include, for example, more or less than 512 bytes of data.

Figure 2:
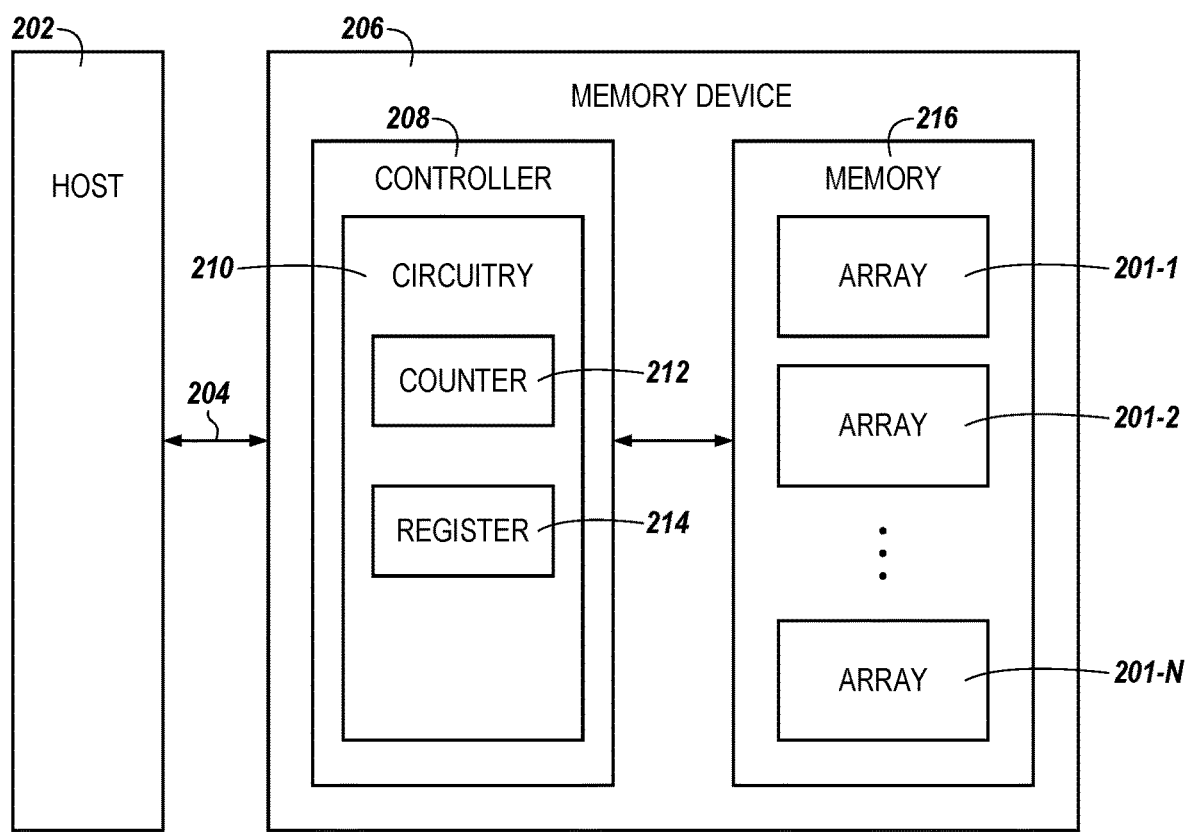
FIG. 2 is a block diagram of a computing system including a host and an apparatus in the form of a memory device in accordance with an embodiment of the present disclosure.

FIG. 2 is a block diagram of a computing system 200 including a host 202 and an apparatus in the form of a memory device 206 in accordance with an embodiment of the present disclosure. As used herein, an "apparatus" can refer to, but is not limited to, any of a variety of structures or combinations of structures, such as a circuit or circuitry, a die or dice, a module or modules, a device or devices, or a system or systems, for example. Further, in an embodiment, computing system 200 can include a number of memory devices analogous to memory device 206.

In the embodiment illustrated in FIG. 2, memory device 206 can include a memory 216 having a number of memory arrays 201-1, 201-2, . . . , 201-N. Memory arrays 201-1, 201-2, . . . , 201-N can be analogous to memory array 101 previously described in connection with FIG. 1. For instance, memory arrays 201-1, 201-2, . . . , 201-N can be NAND flash memory arrays and/or SCM arrays.

Memory arrays 201-1, 201-2, . . . , 201-N can include (e.g., be divided into) a number of groups (e.g., zones or regions) of memory cells. Each respective group can include a plurality of physical units of memory cells, such as, for instance, a plurality of physical pages and/or blocks of memory cells, in a manner analogous to memory array 101 previously described in connection with FIG. 1. A physical unit (e.g., physical page or block) of memory cells can refer to a unit of programing and/or sensing (e.g., a number of memory cells that are programmed and/or sensed together as a functional group), as previously described in connection with FIG. 1.

Each of the physical units of each respective group of memory cells can have a different sequential physical address (e.g., a different physical address in a sequence of physical addresses) associated therewith. A first number of the physical units of each respective group may have data (e.g., user data) stored therein, and each respective one of these first number of physical units of each respective group can also have a different sequential logical address (e.g. a different logical address in a sequence of logical addresses) associated therewith. A second number of (e.g., the remaining) physical units of each respective group may not have data stored therein or a sequential logical address associated therewith, and the physical address associated with each respective one of the second number of physical units of each respective group can be a different consecutive physical address in the sequence. The first number of physical units of each respective group may be referred to herein as the user units of that group, and the second number of physical units of each respective group may be referred to herein as the spare units of that group. An example illustrating the user units and spare units of a group of memory cells will be further described herein (e.g., in connection with FIG. 3).

In an embodiment, each of the physical units of each respective group of memory cells can have the same size. For instance, each of the physical units of each respective group can have the same number of memory cells, and/or can be capable of storing the same amount of data. Further, the spare units of each respective group of memory cells can comprise a prime number of physical units (e.g., the number of spare units of each respective group can be a prime number), such that the greatest common denominator of the number of user units and the number of spare units of each respective group is one. Such a prime numerical relationship between the number of user units and the number of spare units of each respective group can prevent oscillation of the spare units of the group as they move (e.g., slide) through the group, as will be further described herein.

As illustrated in FIG. 2, host 202 can be coupled to the memory device 206 via interface 204. Host 202 and memory device 206 can communicate (e.g., send commands and/or data) on interface 204. Host 202 can be a laptop computer, personal computer, digital camera, digital recording and playback device, mobile telephone, PDA, memory card reader, or interface hub, among other host systems, and can include a memory access device (e.g., a processor). One of ordinary skill in the art will appreciate that "a processor" can intend one or more processors, such as a parallel processing system, a number of coprocessors, etc.

Interface 204 can be in the form of a standardized physical interface. For example, when memory device 206 is used for information storage in computing system 200, interface 204 can be a serial advanced technology attachment (SATA) physical interface, a peripheral component interconnect express (PCIe) physical interface, a universal serial bus (USB) physical interface, or a small computer system interface (SCSI), among other physical connectors and/or interfaces. In general, however, interface 204 can provide an interface for passing control, address, information (e.g., data), and other signals between memory device 206 and a host (e.g., host 202) having compatible receptors for interface 204.

Memory device 206 includes controller 208 to communicate with host 202 and with memory 216 (e.g., memory arrays 201-1, 201-2, . . . , 201-N). For instance, controller 208 can send commands to perform operations on memory arrays 201-1, 201-2, . . . , 201-N, including operations to sense (e.g., read), program (e.g., write), move, and/or erase data, among other operations.

Controller 208 can be included on the same physical device (e.g., the same die) as memory 216. Alternatively, controller 208 can be included on a separate physical device that is communicatively coupled to the physical device that includes memory 216. In an embodiment, components of controller 208 can be spread across multiple physical devices (e.g., some components on the same die as the memory, and some components on a different die, module, or board) as a distributed controller.

Host 202 can include a host controller (not shown FIG. 2) to communicate with memory device 206. The host controller can send commands to memory device 206 via interface 204. The host controller can communicate with memory device 206 and/or the controller 208 on the memory device 206 to read, write, and/or erase data, among other operations.

Controller 208 on memory device 206 and/or the host controller on host 202 can include control circuitry and/or logic (e.g., hardware and firmware). In an embodiment, controller 208 on memory device 206 and/or the host controller on host 202 can be an application specific integrated circuit (ASIC) coupled to a printed circuit board including a physical interface. Also, memory device 206 and/or host 202 can include a buffer of volatile and/or non-volatile memory and a number of registers.

For example, as shown in FIG. 2, memory device can include circuitry 210. In the embodiment illustrated in FIG. 2, circuitry 210 is included in controller 208. However, embodiments of the present disclosure are not so limited. For instance, in an embodiment, circuitry 214 may be included in (e.g., on the same die as) memory 216 (e.g., instead of in controller 208). Circuitry 210 can comprise, for instance, hardware and/or software.

Circuitry 210 can perform wear leveling operations to relocate data stored in memory arrays 201-1, 201-2, . . . , 201-N in accordance with the present disclosure (e.g., without using a table, such as a lookup table or an address translation table). For example, circuitry 214 can, for a group of memory cells, relocate the data stored in the physical unit of the user units of that group, whose physical address in the physical address sequence is immediately before (e.g., in front of) the first of the consecutive physical addresses associated with the spare units of that group, to the last of the consecutive physical addresses associated with the spare units of that group (e.g., the data is relocated from the user unit that is immediately before the first spare unit in the sequence to the last spare unit in the sequence). That is, the physical address associated with the physical unit from which the data is relocated is immediately before the first of the sequential physical addresses associated with the spare units, and the physical address associated with the physical unit to which the data is relocated is the last of the sequential physical addresses associated with the spare units. Such a data relocation may result in the user unit from which the data was relocated becoming the spare unit that has the first of the consecutive physical addresses associated with the spare units, and the spare unit that had the next-to-last of the consecutive physical addresses associated with the spare units becoming the spare unit that has the last of the consecutive physical addresses associated with the spare units (e.g., the user unit from which the data is relocated becomes the first spare unit in the sequence, and the next-to-last spare unit in the sequence becomes the last spare unit in the sequence). An example illustrating such a data relocation operation will be further described herein (e.g., in connection with FIG. 4).

In an embodiment, circuitry 210 may perform such a wear leveling operation to relocate the data responsive to a triggering event. The triggering event may be, for example, a particular number of program operations being performed (e.g., executed) on memory 216. For instance, as shown in FIG. 2, circuitry 210 can include a counter 212 (e.g., a write interval counter) that can count the number of program operations being performed on memory 216, and send a signal to initiate the relocation of the data in response to the particular number of program operations being performed. Circuitry 210 may then perform the operation to relocate the data in response to the initiation signal from counter 212, and counter 212 may be reset to zero upon the data being relocated. The particular number of program operations that may trigger the data relocation may be selected based on the total number of physical units (e.g., the sum of the user units and spare units) of the group, and the theoretical maximum endurance of memory 216. For instance, the particular number of program operations may be selected such that the total number of physical units of the group is much less than the theoretical maximum endurance of memory 216 divided by the particular number of program operations.

Further, as shown in FIG. 2, circuitry 210 can include a register 214. Register 214 can store the logical address (e.g., a value indicating the logical address) associated with the user unit of the group whose physical address in the physical address sequence is the first of the physical addresses in the sequence (e.g., the logical starting location of the user units). Once the spare units of the group have moved through the entire group, register 214 may be incremented by one element.

Although not shown in FIG. 2 for clarity and so as not to obscure embodiments of the present disclosure, in embodiments in which memory arrays 201-1, 201-2, . . . , 201-N include (e.g., are divided into) multiple groups of memory cells, controller 208 can include additional (e.g., separate) circuitry analogous to circuitry 210 for each respective group that can perform wear leveling operations in accordance with the present disclosure on its respective group. For instance, controller 208 can include separate circuitry for each respective group that can, for its respective group, relocate the data stored in the physical unit of the user units of that group, whose physical address in the physical address sequence is immediately before the first of the consecutive physical addresses associated with the spare units of that group, to the last of the consecutive physical addresses associated with the spare units of that group, in a manner analogous to that described for circuitry 210.

Dividing memory arrays 201-1, 201-2, . . . , 201-N into multiple groups in such a manner (e.g., with each respective group having its own separate corresponding wear leveling circuitry) can reduce the number of user units per group. Reducing the number of user units per group can increase the frequency at which the spare units of each respective group rotate and/or move through memory arrays 201-1, 201-2, . . . , 202-N, which can increase the endurance of memory 216 closer to its theoretical maximum. Further, the wear across memory 216 can evened out by performing zone swapping. For instance, the circuitry can swap a "hot" zone of memory 216 (e.g., a zone whose data is being accessed at a high frequency during program and/or sense operations) with a "cold" zone of memory 216 (e.g., a zone whose data is being accessed at a low frequency during program and/or sense operations) by setting (e.g. using an extended base address counter) a particular wear threshold for a "hot" zone, and tracking the number of times the spare units of a zone rotate and/or move through all the physical units of that zone.

In an embodiment, circuitry 210 can change (e.g., tune) the number (e.g., quantity) of the physical units of a group that do not have data stored therein (e.g., change the number of spare units of the group). For example, circuitry 210 can increase the number of spare units of the group to increase the endurance (e.g., the lifetime) of memory 216 (e.g., of the memory cells of memory 216), or decrease the number of spare units of the group to store (e.g., to make room to store) more user data in memory 216. The number of spare units of the group can be changed before or after the data has been relocated in the group.

The number of spare units of the group may be changed, for example, based on the average endurance (e.g. lifetime) of memory 216 (e.g., of the memory cells of memory 216). For instance, the number of spare units may be tuned to match the average endurance of memory 216. As an additional example, the number of spare units of the group may be changed based on the workload of memory 216. For instance, the number of spare units may be tuned to meet the endurance requirements of certain workloads being performed, or to be performed, on memory 216. As an additional example, the number of spare units of the group may be changed based on the type of memory 216 (e.g., NAND flash, SCM, etc.). For instance, the number of spare units may be tuned based on the write endurance parameters for the type of memory 216.

Once the data has been relocated, circuitry 210 can use algebraic mapping to identify the physical location in memory 216 to which the data has been relocated. For example, circuitry 210 can use algebraic mapping (e.g., algebraic logical to physical mapping) to identify (e.g., compute) the physical address associated with the spare unit in the sequence to which the data has been relocated. For instance, circuitry 214 can use the algebraic mapping to identify the physical address associated with the spare unit in the sequence to which the data has been relocated during an operation to sense that relocated data (e.g. upon receiving a request from host 202 to read that relocated data). Such an algebraic mapping will be further described herein (e.g., in connection with FIG. 5).

Further, in an embodiment, once the data has been relocated, circuitry 210 can randomize the logical addresses associated with the user units. Circuitry 210 can randomize the logical addresses associated with the user units, for example, by using a static address randomizer that utilizes a Feistel network, random invertible binary matrix, or fixed address bit scrambling, to randomly map the logical addresses to intermediate addresses. Randomizing the logical addresses associated with the user units can reduce the spatial correlation of (e.g., spatially separate) heavily written (e.g., hot) user units (which otherwise tend to be spatially close to each other), which can increase the endurance of memory 216 closer to its theoretical maximum.

Circuitry 210 can perform additional (e.g., subsequent) wear leveling operations to further relocate the data stored in memory arrays 201-1, 201-2, . . . , 201-N throughout the lifetime of memory 216. For instance, circuitry 210 can perform an additional (e.g., subsequent) operation to relocate the data responsive to an additional (e.g., subsequent) triggering event.

For example, in an operation to relocate data in the memory that is performed subsequent to the example operation previously described herein, circuitry 210 can relocate the data stored in the physical unit of the user units, whose physical address in the physical address sequence is immediately before the physical address associated with the user unit from which the data was relocated in the previous relocation operation (e.g., immediately before the unit that has now become the first of the spare units in the sequence), to the physical address of the spare unit that was previously the next-to-last of the consecutive physical addresses associated with the spare units (e.g., to the spare unit that has now become the last of the spare units in the sequence). Such a data relocation may once again result in the user unit from which the data was relocated becoming the spare unit that has the first of the consecutive physical addresses associated with the spare units, and the spare unit that had the next-to-last of the consecutive physical addresses associated with the spare units becoming the spare unit that has the last of the consecutive physical addresses associated with the spare units, and subsequent data relocation operations can continue to be performed in an analogous manner. An example illustrating a sequence of such subsequent data relocation operations will be further described herein (e.g., in connection with FIG. 4).

The embodiment illustrated in FIG. 2 can include additional circuitry, logic, and/or components not illustrated so as not to obscure embodiments of the present disclosure. For example, memory device 206 can include address circuitry to latch address signals provided over I/O connectors through I/O circuitry. Address signals can be received and decoded by a row decoder and a column decoder, to access memory arrays 201-1, 201-2, . . . , 201-N. Further, memory device 206 can include a main memory, such as, for instance, a DRAM or SDRAM, that is separate from and/or in addition to memory arrays 201-1, 201-2, . . . , 201-N.

Figure 3:
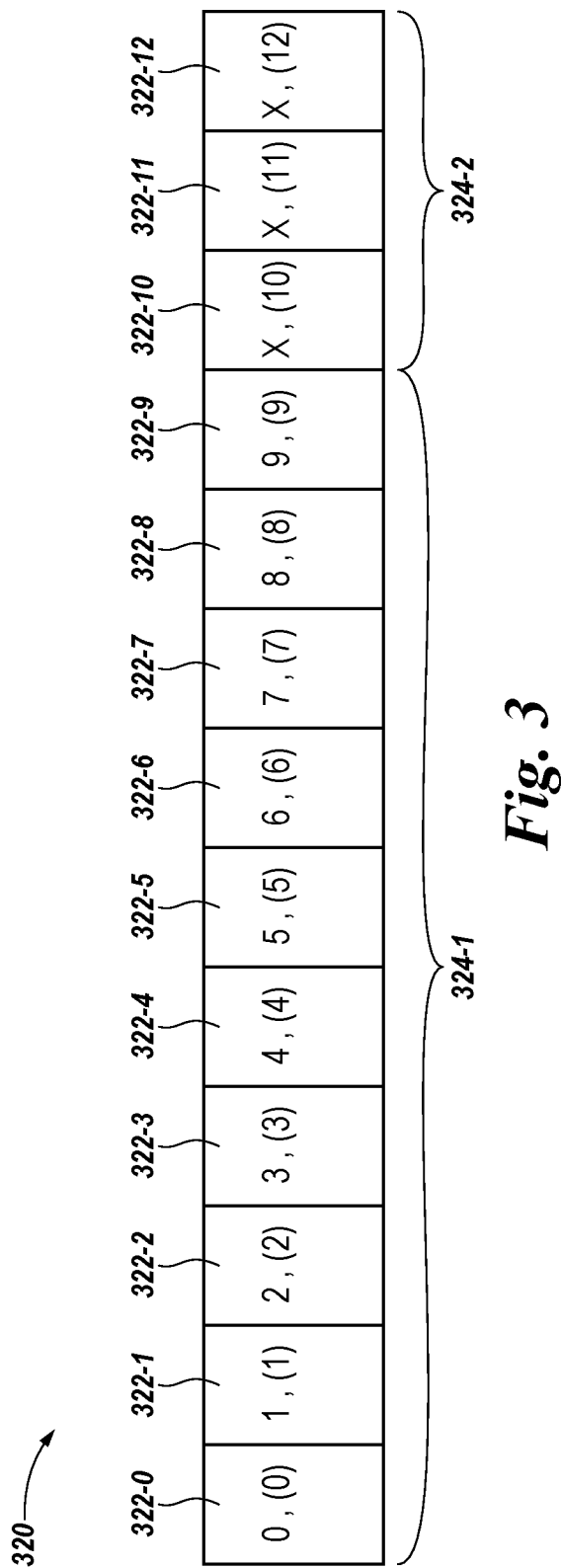
FIG. 3 illustrates a conceptual example of a group of memory cells that includes a plurality of physical units of memory cells in accordance with an embodiment of the present disclosure.

FIG. 3 illustrates a conceptual example 320 of a group of memory cells that includes (e.g., is divided into) a plurality of physical units of memory cells in accordance with an embodiment of the present disclosure. In the example illustrated in FIG. 3, the group includes 13 physical units (e.g., physical units 322-0 through 322-12). However, embodiments of the present disclosure are not limited to a particular number of physical units per group. The physical units can be, for instance, units of programming and/or sensing, as previously described herein, and each respective physical unit can have the same size, as previously described herein.

As shown in FIG. 3, each physical unit 322-0 through 322-12 has a different sequential physical address associated therewith. The physical address for each respective physical unit is illustrated (e.g., represented) in FIG. 3 as the number that is in parentheses for that physical unit. For instance, in the example illustrated in FIG. 3, the sequence of physical addresses runs from 0 to 12, with the physical address for physical unit 322-0 being 0, the physical address for physical unit 322-1 being 1, and so on, up to the physical address for physical unit 322-12 being 12.

In the example illustrated in FIG. 3, physical units 322-0 through 322-9 have data (e.g. user data) stored therein. These physical units may be referred to collectively as user units 324-1. Although the group includes ten user units in the example illustrated in FIG. 3, embodiments of the present disclosure are not limited to a particular number of user units per group. However, the group may include enough user units such that the spare units of the group rotate through the group multiple times before the theoretical maximum endurance of the memory cells of the group is reached.

As shown in FIG. 3, each respective one of the user units 324-1 has a different sequential logical address associated therewith, represented by the number that is not in parentheses for that physical unit. For instance, in the example illustrated in FIG. 3, the sequence of logical addresses runs from 0 to 9, with the logical address for user unit 322-0 being 0, the logical address for user unit 322-1 being 1, and so on, up to the logical address for user unit 322-9 being 9.

The user unit whose logical address is first in the logical address sequence of the group can be referred to herein as the base unit. For instance, in the example illustrated in FIG. 3, user unit 322-0 is the base unit. The physical address associated with the base unit (e.g., 0 in the example illustrated in FIG. 3) can be used during an algebraic mapping to identify a physical location to which data has been relocated, as will be further described herein (e.g., in connection with FIG. 5).

In the example illustrated in FIG. 3, physical units 322-10 through 322-12 do not have data stored therein. Further, physical units 322-10 through 322-12 do not have a sequential logical address associated therewith, as represented by the 'X' in those physical units. These physical units may be referred to collectively as spare units 324-2, and can comprise a prime number of physical units (e.g., three), as previously described herein.

As shown in FIG. 3, the physical address associated with each respective one of the spare units 324-2 is a different consecutive physical address in the physical address sequence of the group. For instance, the physical address associated with spare unit 322-10 is 10, the physical address associated with spare unit 322-11 is 11, and the physical address associated with spare unit 322-12 is 12.

The first spare unit in the spare unit sequence of the group can be referred to herein as the edge unit. For instance, in the example illustrated in FIG. 3, spare unit 322-10 is the edge unit. The physical address associated with the edge unit (e.g., 10 in the example illustrated in FIG. 3) can be used during an algebraic mapping to identify a physical location to which data has been relocated, as will be further described herein (e.g., in connection with FIG. 5).

Figure 4:
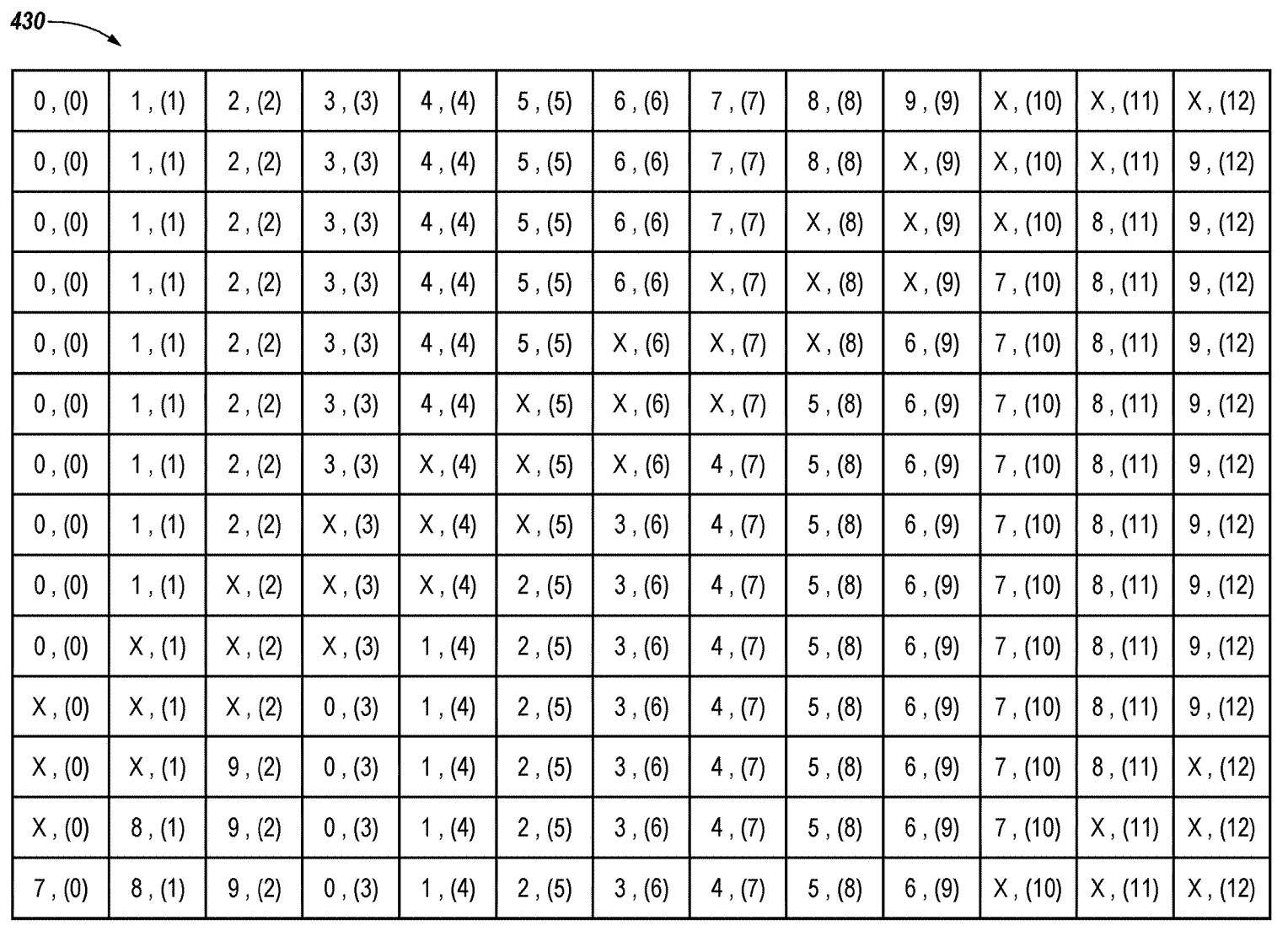

FIG. 4 illustrates a conceptual example 403 of a sequence of data relocation operations performed in memory in accordance with an embodiment of the present disclosure. The memory may be, for example, memory 216 previously described in connection with FIG. 2, and may include a group of memory cells having a plurality of physical units of memory cells, each unit having a different sequential physical address 0 to 12 associated therewith, in a manner analogous to that previously described in connection with FIG. 3. For example, as shown in FIG. 4, the group may include ten user units each having a different sequential logical address 0 to 9 associated therewith, and three spare units that do not have data stored therein or a sequential logical address associated therewith, in a manner analogous to that previously described in connection with FIG. 3. The data relocation operations may be performed by, for example, circuitry 210 previously described in connection with FIG. 2.

The first (e.g., top) row in FIG. 4 shows the allocation of the user units and the spare units of the group before the first data relocation operation of the sequence is performed, and is analogous to the allocation described in connection with FIG. 3. For example, as shown in FIG. 4, the user units have the first ten (e.g., 0 to 9) of the sequential physical addresses associated therewith, and the spare units have the last three (e.g., 10 to 12) of the sequential physical addresses associated therewith.

Each subsequent row below the first row in FIG. 4 shows the allocation of the user units and spare units of the group after the performance of each respective data relocation operation in the sequence. For example, the second row in FIG. 4 shows the unit allocation after the performance of the first data relocation operation, the third row in FIG. 4 shows the unit allocation after the performance of the second data relocation, and so on, down to the last (e.g., bottom) row in FIG. 4 that shows the unit allocation after the performance of the last data relocation operation in the sequence.

As shown in the second row in FIG. 4, after the performance of the first data relocation operation in the sequence, the data that was stored in the user unit, whose physical address in the physical address sequence was immediately before (e.g., to the left of) the first of the consecutive physical addresses associated with the spare units, has been relocated to what was the last of the consecutive physical addresses associated with the spare units. That is, the data that was stored in the physical unit whose physical address is 9 has been relocated to the physical unit whose physical address is 12. Accordingly, as shown in the second row, the user unit from which the data was relocated (e.g., the physical unit whose physical address is 9) has become the first spare unit in the spare unit sequence, and the spare unit that had been the next-to-last spare unit in the spare unit sequence (e.g., the physical unit whose physical address is 11) bas become the last spare unit in the spare unit sequence.

As shown in the third row in FIG. 4, after the performance of the second data relocation operation in the sequence, the data that was stored in the user unit, whose physical address in the physical address sequence was immediately before the first of the consecutive physical addresses associated with the spare units after the first data relocation operation, has been relocated to what was the last of the consecutive physical addresses associated with the spare units after the first data relocation operation. That is, the data that was stored in the physical unit whose physical address is 8 has been relocated to the physical unit whose physical address is 11. Accordingly, as shown in the third row, the user unit from which the data was relocated during the second data relocation operation (e.g., the physical unit whose physical address is 8) has become the first spare unit in the spare unit sequence, and the spare unit that had been the next-to-last spare unit in the spare unit sequence before the second data relocation operation (e.g., the physical unit whose physical address is 10) has become the last spare unit in the spare unit sequence.

As shown in the fourth row in FIG. 4, after the performance of the third data relocation operation in the sequence, the data that was stored in the user unit, whose physical address in the physical address sequence was immediately before the first of the consecutive physical addresses associated with the spare units after the second data relocation operation, has been relocated to what was the last of the consecutive physical addresses associated with the spare units after the second data relocation operation. That is, the data that was stored in the physical unit whose physical address is 7 has been relocated to the physical unit whose physical address is 10. Accordingly, as shown in the fourth row, the user unit from which the data was relocated during the third data relocation operation (e.g., the physical unit whose physical address is 7) has become the first spare unit in the spare unit sequence, and the spare unit that had been the next-to-last spare unit in the spare unit sequence before the third data relocation operation (e.g., the physical unit whose physical address is 9) has become the last spare unit in the spare unit sequence.

The remaining data relocation operations of the sequence can continue in an analogous manner, as shown in the remaining rows in FIG. 4. As such, it can be seen that the effect of the data relocation operations is to sequentially move (e.g., slide) the spare units through the user units, until the spare units have rotated through the entire group. Each respective data relocation operation in the sequence can be performed responsive to a separate triggering event, as previously described herein (e.g., in connection with FIG. 2).

Although the example sequence illustrated in FIG. 4 includes 13 data relocation operations, embodiments of the present disclosure are not so limited. For instance, additional data relocation operations can continue to be performed (e.g., responsive to subsequent triggering events) in an analogous manner throughout the lifetime of the memory.

Figure 5:
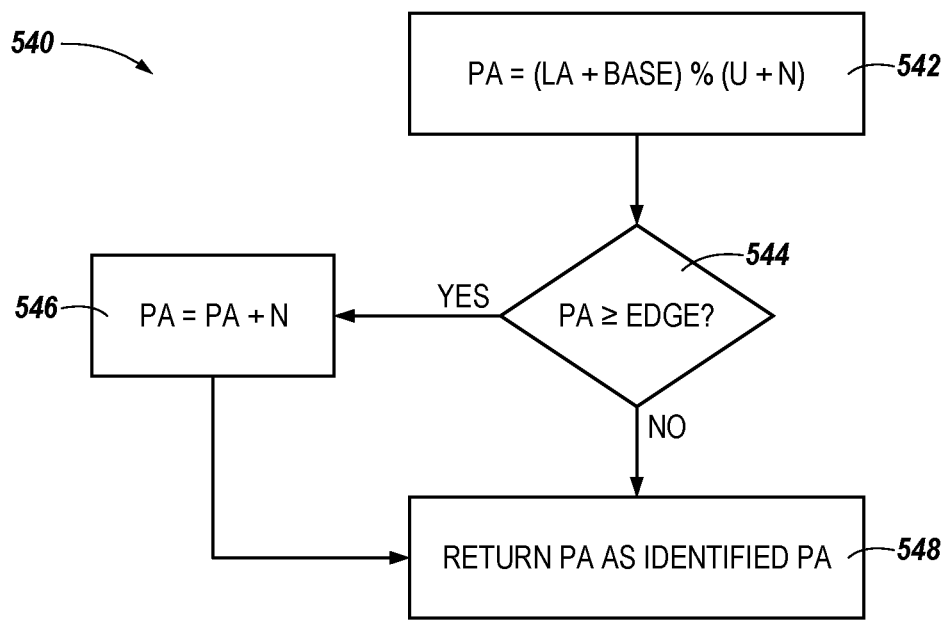
FIG. 5 illustrates a method for an algebraic mapping to identify a physical location to which data has been relocated in memory in accordance with an embodiment of the present disclosure.

FIG. 5 illustrates a method 540 for an algebraic mapping to identify a physical location to which data has been relocated in memory in accordance with an embodiment of the present disclosure. The memory may be, for example, memory 216 previously described in connection with FIG. 2, and may include a group of memory cells having a plurality of physical units (e.g., user units and spare units) of memory cells, each unit having a different sequential physical address associated therewith, in a manner analogous to that previously described in connection with FIGS. 2-3. Method 540 (e.g., the algebraic mapping illustrated in FIG.

5) can be performed by, for instance, circuitry 210 previously described in connection with FIG. 2.

At block 542, a physical address for the relocated data is determined (e.g., calculated). As shown in FIG. 5, the physical address (PA) for the relocated data is given by:

$$PA = (LA + BASE) \% (U+N)$$

where LA is the logical address of the relocated data in the memory, BASE is the physical address associated with the base unit of the group, U is the number of user units in the group, and N is the number of spare units in the group (e.g., U+N is the total number of physical units in the group).

At block 544, it is determined whether the physical address for the relocated data calculated at block 542 is greater than or equal to the physical address associated with the edge unit of the group. If it is determined that the physical address calculated at block 542 is not greater than or equal to the physical address associated with the edge unit of the group, then the physical address calculated at block 542 is determined to be the physical location to which the data has been relocated in the memory, and that physical address is returned as the identified physical location (e.g., the identified physical address) at block 548.

If it is determined at block 544 that the physical address calculated at block 542 is greater than or equal to the physical address associated with the edge unit of the group, then the physical address calculated at block 542 is not the physical location to which the data has been relocated in the memory. Instead, method 540 proceeds to block 546, where a different physical address for the relocated data is determined (e.g., calculated). As shown in FIG. 5, this physical address (PA) is calculated by adding the number of spare units in the group (N) to the physical address (PA) calculated at block 542. This physical address calculated at block 546 is then returned as the identified physical location (e.g., the identified physical address) to which the data has been relocated at block 548.

Although specific embodiments have been illustrated and described herein, those of ordinary skill in the art will appreciate that an arrangement calculated to achieve the same results can be substituted for the specific embodiments shown. This disclosure is intended to cover adaptations or variations of a number of embodiments of the present disclosure. It is to be understood that the above description has been made in an illustrative fashion, and not a restrictive one. Combination of the above embodiments, and other embodiments not specifically described herein will be apparent to those of ordinary skill in the art upon reviewing the above description. The scope of a number of embodiments of the present disclosure includes other applications in which the above structures and methods are used. Therefore, the scope of a number of embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
   a memory having a plurality of physical units of memory cells, wherein:
     each of the physical units has a different sequential physical address associated therewith;
     a first number of the physical units have data stored therein; and
     a second number of the physical units do not have data stored therein, wherein the physical address associated with each respective one of the second number of physical units is a different consecutive physical address in the sequence; and
   circuitry configured to relocate the data stored in the physical unit of the first number of physical units, whose physical address in the sequence is immediately before the first of the consecutive physical addresses associated with the second number of physical units, to the last of the consecutive physical addresses associated with the second number of physical units.

2. The apparatus of claim 1, wherein the circuitry is configured to change the second number of the physical units that do not have data stored therein.

3. The apparatus of claim 1, wherein the circuitry is configured to randomize logical addresses associated with the first number of physical units that have data stored therein after the data has been relocated to the last of the consecutive physical addresses associated with the second number of physical units.

4. The apparatus of claim 1, wherein:
   the memory includes an additional plurality of physical units of memory cells, wherein:
     each of the additional physical units has a different sequential physical address associated therewith;
     a first number of the additional physical units have data stored therein; and
     a second number of the additional physical units do not have data stored therein, wherein the physical address associated with each respective one of the second number of additional physical units is a different consecutive physical address in the sequence; and
   the apparatus includes additional circuitry configured to relocate the data stored in the physical unit of the first number of additional physical units, whose physical address in the sequence is immediately before the first of the consecutive physical addresses associated with the second number of additional physical units, to the last of the consecutive physical addresses associated with the second number of additional physical units.

5. The apparatus of claim 1, wherein:
   the circuitry includes a counter configured to count a number of program operations being performed on the memory; and
   the circuitry is configured to initiate the relocation of the data in response the counter reaching a particular number of program operations performed on the memory.

6. The apparatus of claim 1, wherein the circuitry includes a register configured to store a logical address associated with the physical unit of the first number of physical units whose physical address is the first of the physical addresses in the sequence.

7. The apparatus of claim 1, wherein the circuitry comprises hardware.

8. The apparatus of claim 1, wherein the circuitry comprises software.

9. A method of operating memory, comprising:
relocating data stored in a first physical unit of the memory to a second physical unit of the memory, wherein:
the first physical unit of the memory is one of a plurality of physical units of the memory that have data stored therein and have different physical addresses associated therewith;
the second physical unit of the memory is one of a plurality of physical units of the memory that do not have data stored therein and have different sequential physical addresses associated therewith;
the physical address associated with the first physical unit of the memory is immediately before the first of the sequential physical addresses; and
the physical address associated with the second physical unit of the memory is the last of the sequential physical addresses.

10. The method of claim 9, wherein the method includes using algebraic mapping to identify the physical address associated with the second physical unit to which the data stored in the first physical unit of the memory has been relocated.

11. The method of claim 10, wherein the method includes using the algebraic mapping to identify the physical address associated with the second physical unit to which the data stored in the first physical unit of the memory has been relocated during an operation to sense the relocated data.

12. The method of claim 9, wherein the method includes relocating the data stored in the first physical unit of the memory to the second physical unit of the memory responsive to a particular number of program operations being performed on the memory.

13. The method of claim 9, wherein:
relocating the data stored in the first physical unit of the memory to the second physical unit of the memory results in:
the first physical unit of the memory becoming the physical unit of the memory that does not have data stored therein and has the first of the sequential physical addresses associated therewith; and
a third physical unit of the memory becoming the physical unit of the memory that does not have data stored therein and has the last of the sequential physical addresses associated therewith; and
the method further includes relocating data stored in a fourth physical unit of the memory to the third physical unit of the memory, wherein the physical address associated with the fourth physical unit of the memory is immediately before the physical address associated with the first physical unit of the memory.

14. An apparatus, comprising:
a memory having a plurality of groups of memory cells, wherein:
each of the groups includes a plurality of physical units of memory cells;
each of the physical units of each respective group has a different sequential physical address associated therewith;
a first number of the physical units of each respective group have data stored therein; and
a second number of the physical units of each respective group do not have data stored therein, wherein the physical address associated with each respective one of the second number of physical units of each respective group is a different consecutive physical address in the sequence; and
circuitry configured to, for each respective group, relocate the data stored in the physical unit of the first number of physical units of that group, whose physical address in the sequence is immediately before the first of the consecutive physical addresses associated with the second number of physical units of that group, to the last of the consecutive physical addresses associated with the second number of physical units of that group.

15. The apparatus of claim 14, wherein the circuitry comprises separate circuitry for each respective group.

16. The apparatus of claim 14, wherein each of the physical units of each respective group have a same size.

17. The apparatus of claim 14, wherein the second number of the physical units of each respective group that do not have data stored therein comprises a prime number of physical units.

18. The apparatus of claim 14, wherein the memory comprises three-dimensional cross-point memory.

19. A method of operating memory, comprising:
changing a quantity of physical units of the memory that do not have data stored therein, wherein the physical units of the memory that do not have data stored therein have different sequential physical addresses associated therewith; and
relocating data stored in a physical unit of the memory to one of the physical units of the memory that do not have data stored therein after changing the quantity of physical units that do not have data stored therein, wherein:
a physical address associated with the physical unit of the memory from which the stored data is relocated is immediately before the first of the sequential physical addresses; and
the physical address associated with the physical unit of the memory to which the stored data is relocated is the last of the sequential physical addresses.

20. The method of claim 19, wherein the method includes relocating the data stored in the physical unit of the memory to the one of the physical units of the memory that do not have data stored therein without using a table.

21. The method of claim 19, wherein the method includes changing the quantity of physical units of the memory that do not have data stored therein based, at least in part, on an average endurance of the memory.

22. The method of claim 19, wherein the method includes changing the quantity of physical units of the memory that do not have data stored therein based, at least in part, on a workload of the memory.

23. The method of claim 19, wherein the method includes changing the quantity of physical units of the memory that do not have data stored therein based, at least in part, on a type of the memory.

24. The method of claim 19, wherein changing the quantity of physical units of the memory that do not have data stored therein includes increasing the quantity of physical units of the memory that do not have data stored therein.

25. The method of claim 19, wherein changing the quantity of physical units of the memory that do not have data stored therein includes decreasing the quantity of physical units of the memory that do not have data stored therein.

* * * * *